(No Model.)
J. M. NELSON.
Vehicle Wheel.
No. 235,167.  Patented Dec. 7, 1880.
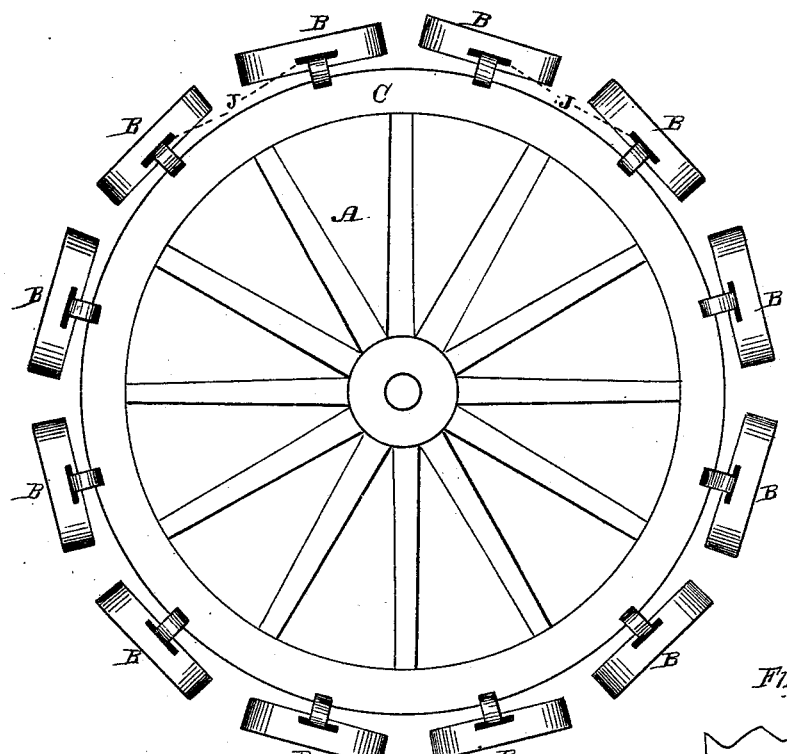
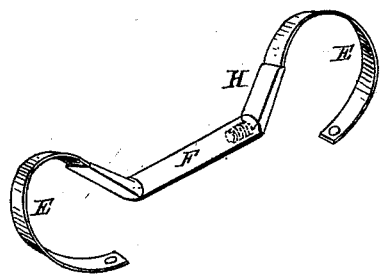
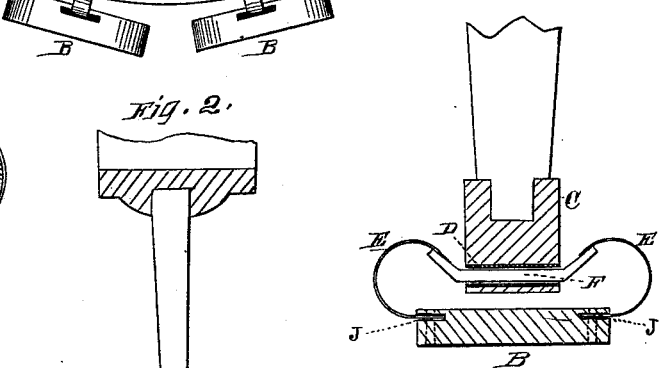

United States Patent Office.

JOSHUA M. NELSON, OF OAKDALE, CALIFORNIA.

VEHICLE-WHEEL.

SPECIFICATION forming part of Letters Patent No. 235,167, dated December 7, 1880.

Application filed September 30, 1880. (No model.)

*To all whom it may concern:*

Be it known that I, JOSHUA M. NELSON, of Oakdale, county of Stanislaus, State of California, have invented a Wheel-Track; and I hereby declare the following to be a full, clear, and exact description thereof.

My invention relates to a wheel-track; and it consists of peculiarly-shaped sections of metal or metal-protected wood attached by springs to the felly of the wheel, and turning with the wheel, each section presenting itself to the ground and forming a continuous and traveling track, on which heavy wheels of machinery and great wagons can run, as will hereinafter more particularly appear.

The object of my invention is to provide a means by which heavy machinery and loaded wagons can be transported from place to place over rough or smooth roads without damage either to the machinery or wagons or to the roads.

Referring to the accompanying drawings, Figure 1 is a view of my invention. Figs. 2 and 3 are sections. Fig. 4 shows the springs with the axle.

Let A represent the wheel of any cumbersome or unwieldy wagon. The sections B, attached to the outer rim of the felly C, constitute the continuous and traveling track. These sections B are made of wood, protected on both sides by iron plates, or they may be made entirely of metal. They are rounded at the ends, as shown, so that they will not interfere with one another in making a turn. They are placed all around the wheel, and may be set so close together when a smooth road is being traveled as to form practically an outer circumference or rim for the wheel; but when a rough road has to be gone over the sections B must be set farther apart, so that they may straighten themselves if they get out of place.

The sections B are considerably wider than the tire of the wheel, thus presenting a firm track.

I will now describe the mode I have invented of attaching these sections to the felly of the wheel.

Cylindrical boxing D, as long as the felly is wide, is placed in the felly near the tire, as shown.

I make a spring, E, in the shape as shown, with its horizontal cylindrical shaft or axle F. This shaft or axle F is pushed through the boxing D and locked on the other side by screwing the end H of the other spring into it, thus uniting the two springs to the shaft.

The shaft or axle F fits loosely in the boxing D, thus forming a hinge for the whole spring and the sections. The ends of the springs are secured to the sections, one on each side, in longitudinal slots J about the central point, with bolts passing through from the outside and screwed into the iron plate on the opposite side. The tips of the springs work loosely in the slots J, where they are secured to the sections in order to facilitate the making of a turn.

The weight of the sections always keeps them in position, and the boxing, acting as a hinge for them, is placed in the felly near the tire, so that the springs may not throw the sections away from the position they should occupy when in use.

This track can be put on or off with little trouble. It would be of much use to freight-wagons on sandy roads, or even on hard roads, as the draft is much reduced, and instead of wearing or cutting ruts, as is usually the case with heavy wagons, it will improve rather than injure the road.

Having thus described my invention, what I claim as new, and desire to secure by Letters Patent, is—

1. The shafts or journals F, extending through the wheel-rims or inclosing-boxes and having the curved springs E, uniting their ends to the section B, substantially as and for the purpose herein described.

2. The independent sections B, having slots, as shown at J, to allow them to move upon the connecting-springs E, in combination with the wheel A, having the boxes D, adapted to receive the journals or axles F, whereby the sections act as an independent adjustable tread for the wheel, and are allowed to adjust themselves when the wheel turns, substantially as herein described.

In witness whereof I have hereunto set my hand.

JOSHUA M. NELSON.

Witnesses:
S. P. ROGERS,
L. C. BRANCH.